US008582254B2

(12) United States Patent
Aimi

(10) Patent No.: US 8,582,254 B2
(45) Date of Patent: Nov. 12, 2013

(54) SWITCHING ARRAY HAVING CIRCUITRY TO ADJUST A TEMPORAL DISTRIBUTION OF A GATING SIGNAL APPLIED TO THE ARRAY

(75) Inventor: Marco Francesco Aimi, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 13/096,071

(22) Filed: Apr. 28, 2011

(65) Prior Publication Data

US 2011/0198967 A1 Aug. 18, 2011

Related U.S. Application Data

(63) Continuation-in-part of application No. 12/474,299, filed on May 29, 2009.

(51) Int. Cl.
*H02H 7/00* (2006.01)

(52) U.S. Cl.
USPC .......... 361/2

(58) Field of Classification Search
None
See application file for complete search history.

(56) References Cited

U.S. PATENT DOCUMENTS 4,525,762 A * 6/1985 Norris .......... 361/13
4,723,187 A 2/1988 Howell
5,374,792 A 12/1994 Ghezzo et al.
5,430,597 A * 7/1995 Bagepalli et al. .......... 361/102
6,671,149 B1 12/2003 Chea, Jr.
6,700,770 B2 3/2004 Chea, Jr.
7,030,416 B2 4/2006 Kitagawa et al.
7,109,560 B2 9/2006 Strumpler
7,297,571 B2 11/2007 Ziaei et al.
7,737,810 B2 6/2010 Chan et al.
2006/0171088 A1* 8/2006 Carcouet et al. .......... 361/93.1
2007/0139145 A1 6/2007 Subramanian et al.
2008/0164961 A1 7/2008 Premerlani et al.
2008/0211347 A1* 9/2008 Wright et al. .......... 310/318
2008/0310056 A1 12/2008 Kumfer et al.
2009/0115255 A1 5/2009 Kumfer et al.
2009/0272634 A1* 11/2009 Ehlers et al. .......... 200/181

FOREIGN PATENT DOCUMENTS

WO 2005006364 A1 1/2005
WO 2008153576 A1 12/2008

OTHER PUBLICATIONS

Brown, Elliot R., "RF—MEMs Switches for Reconfigurable Integrated Circuits", Nov. 1998; vol. 46, pp. 1868-1880.

* cited by examiner

*Primary Examiner* — Jared Fureman
*Assistant Examiner* — Terrence Willoughby
(74) *Attorney, Agent, or Firm* — Robert M. McCarthy

(57) ABSTRACT

A Micro-electro-mechanical systems (MEMS) switching array includes circuitry, which may be coupled to a gate line of the array to adjust a temporal distribution of a gating signal applied to a plurality of MEMS switches that make up the switching array. The temporal distribution may be shaped to reduce a voltage surge that can develop in the switches during switching of electrical current. This voltage surge reduction is conducive to improving the durability of the array.

21 Claims, 11 Drawing Sheets

SWITCHING ARRAY HAVING CIRCUITRY TO ADJUST A TEMPORAL DISTRIBUTION OF A GATING SIGNAL APPLIED TO THE ARRAY

RELATED APPLICATIONS

This application is a continuation-in-part of U.S. patent application Ser. No. 12/474,299, filed on May 29, 2009, which is herein incorporated by reference in its entirety.

BACKGROUND

The invention relates generally to the area of electrical components. More specifically, the invention relates to the area of reliability of electrical components such as electrical switches and electrical switch arrays.

Micro-electro-mechanical systems (MEMS) represent an integration of mechanical elements, with electrical elements on a substrate through micro-fabrication technology. While the electrical elements are typically fabricated using integrated circuit fabrication processes, the mechanical components are typically fabricated using compatible micromachining processes, such as lithographic, metallization, or etching processes. The ability to employ such processes is a key advantage of MEMS fabrication technology as it allows for enhanced control of the characteristic "micro-scale" dimensions typical of MEMS devices. Such processes also enable efficient production of MEMS devices by enabling batch fabrication of the MEMS devices on a common substrate die.

MEMS technology is suited to fabricate components, such as actuators or switches, that require a limited range of motion for their operation. Switch arrays may also be realized based on MEMS technology.

One type of MEMS includes a suspended connecting member, which connecting member may be in the form of a movable beam, such as a cantilever. Such a device may further include an actuation mechanism, which actuation mechanism may be electrostatic, to cause a movement of the suspended connecting member. The movement enables an electrical communication between any two or more parts of the MEMS by causing a "making" and "breaking" of an electrical contact between a surface of the suspended connecting member and a surface of an adjacent part of the MEMS.

Unacceptably high voltages can develop across a MEMS switch array when the MEMS switch array "opens" from an energized state. The development of such voltages can result in arcing between electrical contacts of the individual switches of the switch array. Therefore, an issue affecting reliability of performance of a MEMS switch array concerns the possibility of arcing between, or welding of, the two components under question during the opening. This arcing and/or welding may result in uncontrolled variation in the electrical contact resistance, and indeed, may also result in temporary or permanent seizure of any one or more electrical contacts. Development of reliable and cost-effective MEMS and MEMS arrays is one of the challenges facing MEMS technology. High reliability MEMS and MEMS arrays would therefore, be highly desirable.

BRIEF DESCRIPTION OF THE INVENTION

Aspects of the present invention may be fulfilled by a micro-electro-mechanical systems (MEMS) switching array including a plurality of MEMS switches coupled to switch a current in response to a gating signal applied through a gate line. Circuitry may be coupled to the gate line to adjust a temporal distribution of the gating signal applied to the plurality of MEMS switches. The temporal distribution may be shaped to reduce a voltage surge that can develop in at least some of the plurality of MEMS switches during the switch of current.

Aspects of the present invention may be further fulfilled by a system including an array of MEMS switches coupled to switch a current in response to a gating signal applied through a gate line. A gate driver may be coupled to the gate line to supply the gate signal. Circuitry may be coupled to the gate line to adjust a temporal distribution of the gating signal applied to the plurality of MEMS switches. The temporal distribution is shaped to reduce a voltage surge that can develop in at least some of the MEMS switches.

DRAWINGS

DETAILED DESCRIPTION OF THE INVENTION

Figure 1:
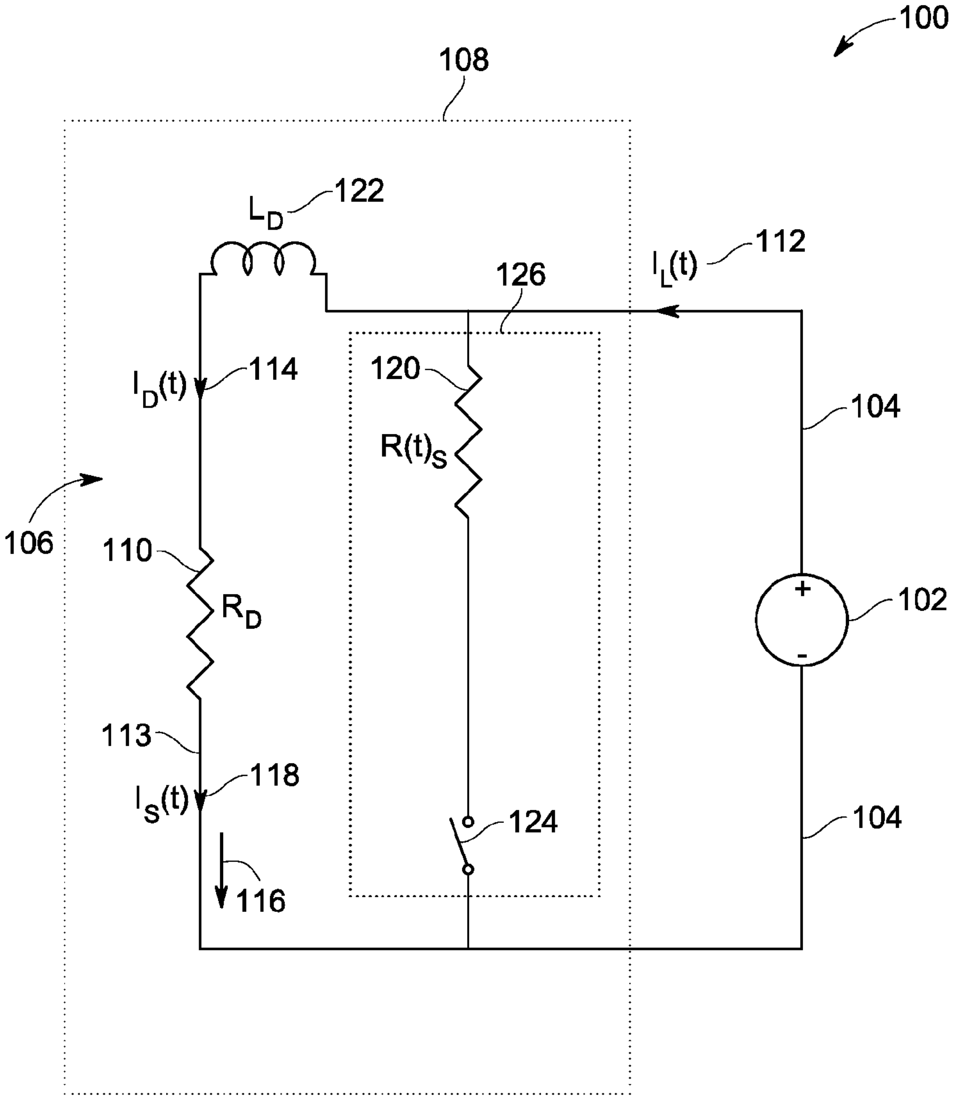
FIG. 1 is a schematic view of an electrical system, in accordance with one embodiment of the invention.

In the following description, whenever a particular aspect or feature of an embodiment of the invention is said to comprise or consist of at least one element of a group and combinations thereof, it is understood that the aspect or feature may comprise or consist of any of the elements of the group, either individually or in combination with any of the other elements of that group.

As used herein, the term "switch" refers to a device that can be used to connect and disconnect two parts of an electrical component. The mechanism of operation of such switches may be mechanical, or it may be electrical, or it may be chemical, or it might be a combination of the above. A suitable non-limiting example of such a switch is a micro-electro-mechanical system switch.

As used herein, the term "switch array" may refer to an array of switches that have been fabricated on a single die or it may refer to an array of dies each of which includes multiple switches.

Systems and methods to protect an electrical device, such as a switch array are known. Non-limiting examples of switches include micro-electro-mechanical systems (MEMS). One known "protective" system includes a hybrid arc limiting technology (HALT) circuit (see, for instance, Kumfer et al., U.S. Patent Publication Number 2009/0115255A1; Kumfer et al., U.S. Patent Publication Number 2008/0310056A1; Howell, U.S. Pat. No. 4,723,187). The HALT circuit shields the electrical device from arcing during an interruption of a load current and/or of a fault current. In one non-limiting example, the array of MEMS may service, for instance, a motor-starter system.

During a fault condition, an electrical device is typically required to "open" expeditiously. The resulting and correspondingly sudden change in an amount of electric bias, results in a development of a bias across the device, and presents a damage risk for the electrical device due to a possibility of the bias induced, arcing across electrical contacts within the electrical device. A protective circuit, for example, a HALT circuit, works by substantially preventing a resultant bias, for example, a voltage, across the electrical contacts from exceeding a so called "melt voltage" of the electrical contacts, as they are opening. There are multiple factors contributing to the voltage. A first contribution is due to a static unbalanced voltage of a diode bridge in the HALT circuit. The static unbalanced voltage is substantially a result of a simultaneous flow of both a load electric current, and an electric current pulse that is produced through the diode bridge by the HALT circuit. Systems and methods that address mitigation strategies of the static unbalanced voltage are known (see, for instance, the documents referenced above). It has been ascertained that, a second contribution to the voltage, is substantially a result of an inductive voltage surge in the wiring of the HALT circuit diode bridge.

Previous approaches to mitigate the inductive voltage surge have involved appropriate modifications to the basic HALT circuit design. Such approaches potentially are adequate at relatively low values of fault or load electric currents due to correspondingly low levels of inductive voltage surge. At relatively higher fault or load current values, the inductive voltage surge is correspondingly higher, and therefore, additional strategies to mitigate the inductive voltage surge may be useful. Aspects of the invention disclosed herein include systems and methods to control the inductive voltage surge within the HALT circuit. The disclosed methods include appropriately distributing the opening of any one or more individual switches belonging to switch array.

FIG. 1 shows an electric system 100 wherein an electric device 102 (the "load") is coupled via electromagnetic coupling 104 to a protective HALT circuit 106. The HALT circuit 106 is depicted via an equivalent circuit diagram 108, and serves typically as a protective circuit for an electric device 126. Non-limiting examples of electrical devices include switch arrays. Non-limiting examples of individual switches include MEMS. The principles of operation of a protective circuit, such as the HALT circuit 106, have been described elsewhere (see, for instance, the documents referenced above). The HALT circuit 106 includes a diode bridge 110 that is represented via its equivalent resistance R D as is visible to the electric device 126. Quite generally, a load electric current I L (t) 112 flows through the electric device 126. During, for instance, a fault condition, the operation of the HALT circuit 106 includes sending a time-dependent electric current pulse I D (t) 114 to forward bias the HALT diode bridge 110. This results in a creation of an alternate "shunt" electric current flow path 116 within the electric system 100 that supports a time-dependent shunt electric current I S (t) 118. The alternate shunt electric current flow path 116 is created substantially in the same electromagnetic coupling 113 within which flows the electric current I D (t) 114. (For the sake of clarity, the two contributions to the electric current within electromagnetic coupling 113, namely, I D (t) 114 and I S (t) 118 are depicted separately.) The electric device 126 includes a time-dependent resistance that effectively is in parallel with the alternate current flow path 116. The resistance R(t) S substantially includes the time-dependent resistance of the electric device 126 and is indicated via reference numeral 120. Further, as seen by the electric device 126, the diode bridge of the HALT circuit 110 includes a stray inductance L D 122. In one embodiment, the electric device 126 includes a means to interrupt flow of electric current 124.

As discussed herein, embodiments of the electric device 126 include a MEMS switch array and operate as a motor starter. During a fault condition a motor starter is required to perform a function of opening the individual switches of the switch array, that is, of interrupting the flow of electric current through the electric device 126. Similarly, during a load condition, a motor starter is required to perform the function of closing the individual switches of the switch array, that is, of energizing the load 102 by initiating a flow of electric current through it via the electric device 126. However, as discussed above, even with the aid of a HALT circuit 106 to relieve the switch array 126 as they are opened or closed, the stray inductance of the HALT circuit 106 itself may present an obstacle to arcless operation of the switch array 126. As will be discussed in relation to FIGS. 2-5, below, the opening time distribution of individual switches of the switch array 126 (or more generally, of an electric device), represents one possible way to shape the time development of the inductive voltage surge during the time window over which the individual switches of the switch array open.

It may be evident that, during a fault condition, with the progressive opening of the electric device 126, the resistance of the electric device 126 will also rise in a corresponding manner. The corresponding rise in voltage across the electric device 126 drives the load current I L (t) 112 into the HALT circuit diode bridge 110 against the resistance and inductance of the HALT circuit diode bridge 110. This substantially results in an inductive voltage surge across the electric device 126.

It may be evident that, during a time window wherein the time-dependent electric current pulse I D (t) 114 substantially exceeds the time-dependent load current I L (t) 112, alternate flow path 116 represents a low resistance shunting path for the time-dependent load current I L (t) 112. This time window then, represents a "time window of opportunity" to open the electric device 126. In the interest of clarity, the discussions herein will substantially consider a switch array as a non-limiting example of an electric device 126.

Figure 2:
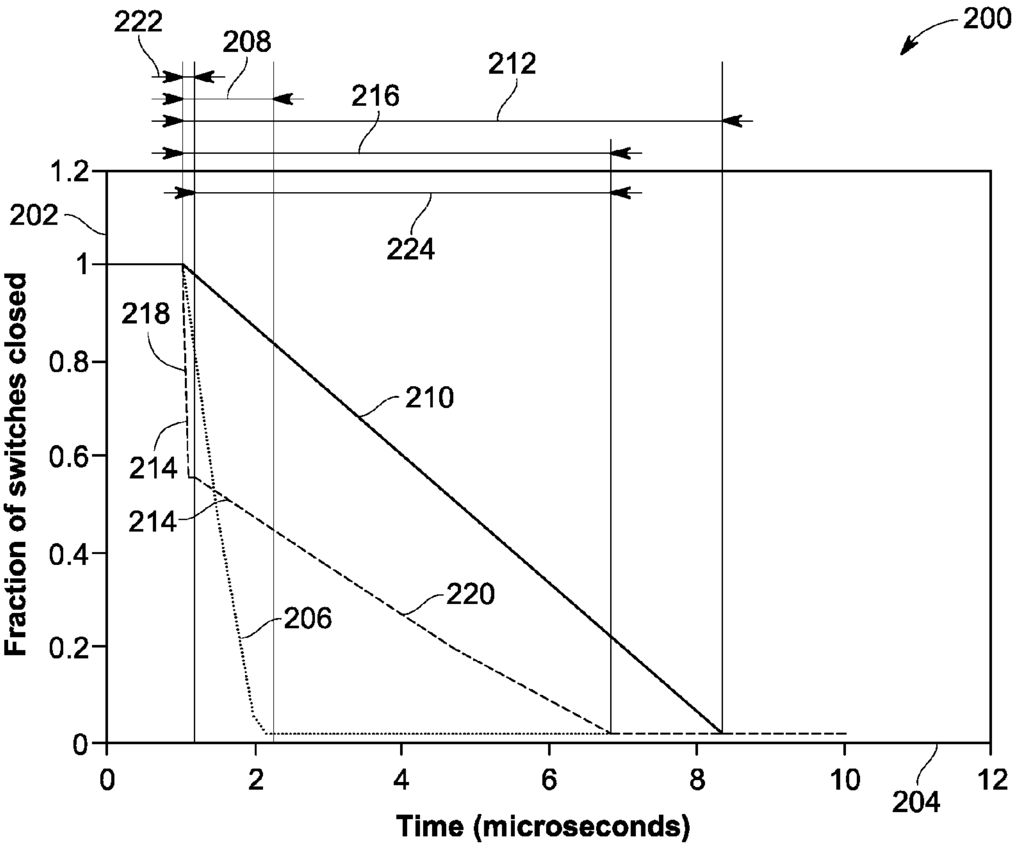
FIG. 2 is a graph of three representative possibilities for opening time distribution of individual switches of a switch array, in accordance with one embodiment of the invention.
Figure 3:
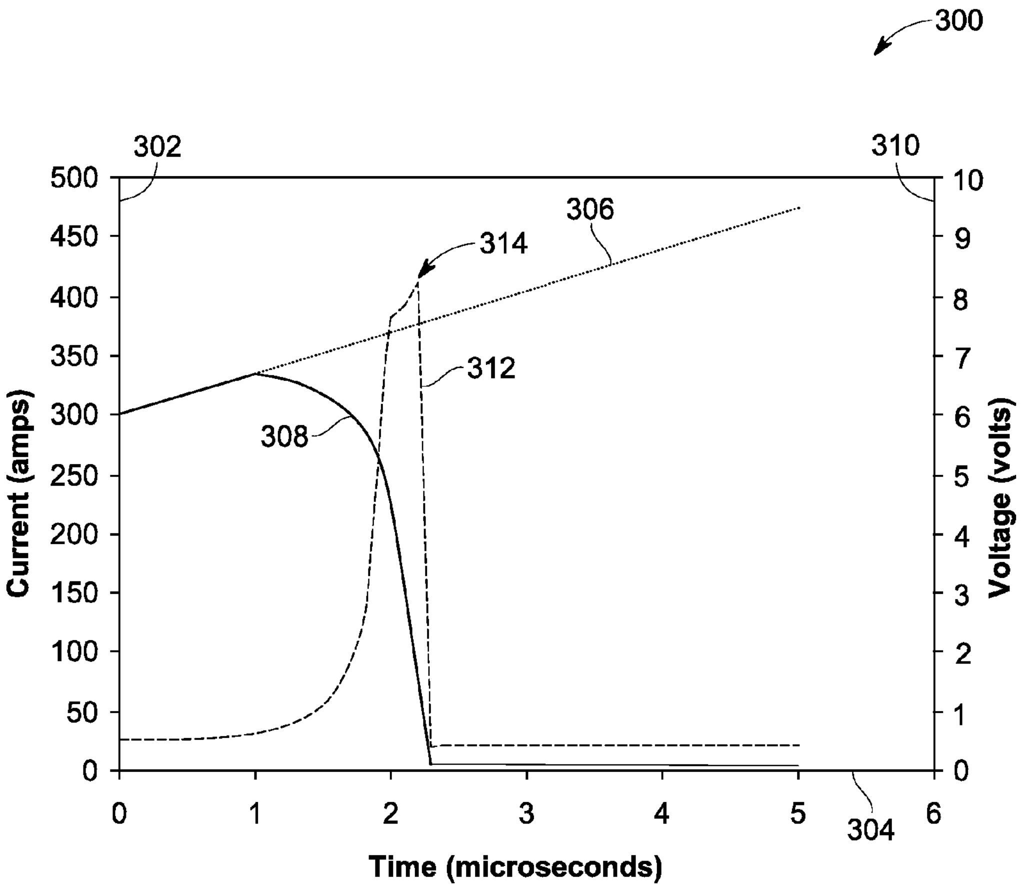
FIG. 3 is a graph that represents a time variation of load current, a time variation of HALT circuit current, and a time variation of the corresponding inductive voltage surge for a "fast" opening time distribution.
Figure 4:
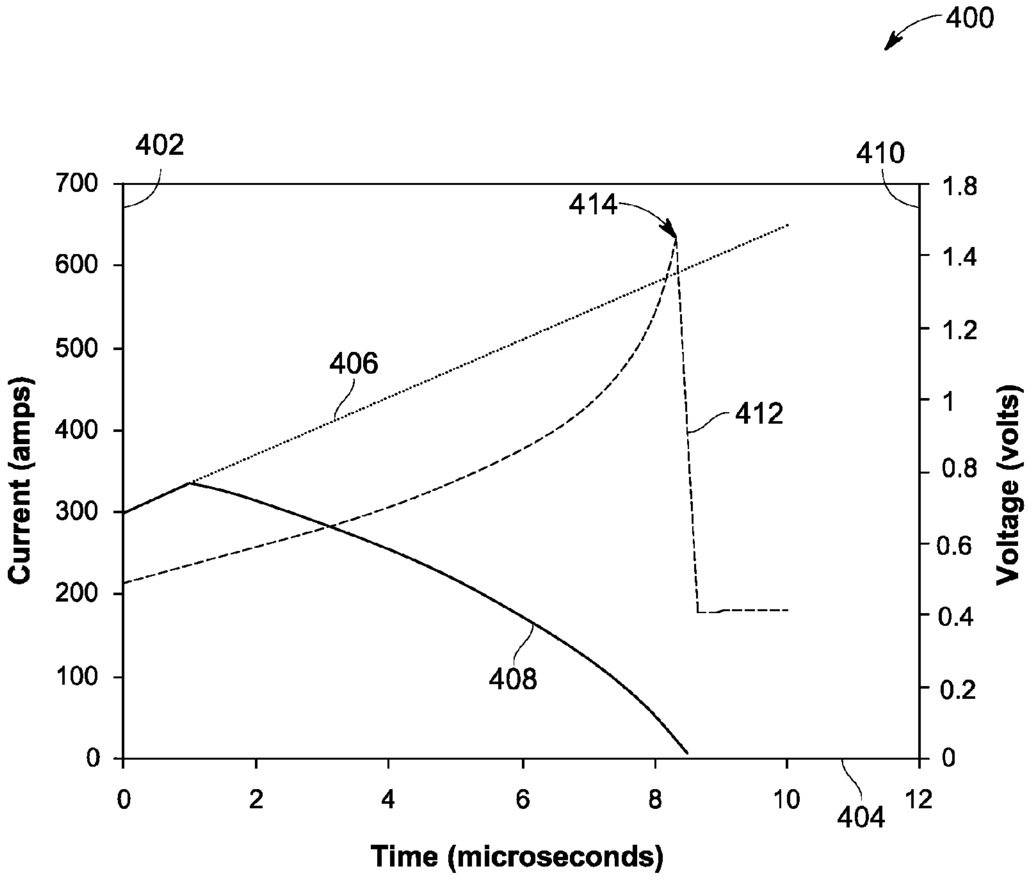
FIG. 4 is a graph that represents a time variation of load current, a time variation of HALT circuit current, and a time variation of the corresponding inductive voltage surge for a "slow" opening time distribution, in accordance with one embodiment of the invention.

It has been determined, as discussed in relation to FIGS. 2-4, that a magnitude of the inductive voltage surge that occurs across the HALT circuit 106, for instance, across the diode bridge 110 of the HALT circuit 106, depends, among other factors, on how individual switches of the switch array (that is, the electrical device 126) are opened during the time window of opportunity. In other words, it has been determined that a opening time distribution of individual switches of the switch array is one of the factors determining the magnitude of the inductive voltage surge across the electric device 126. It has further been determined that a distribution of opening times of individual switches of the switch array is one of the factors determining the magnitude of the inductive voltage surge across HALT circuit 106. Furthermore, it is likely that at least a portion of the inductive voltage surge appears across the diode bridge of the HALT circuit 110.

FIG. 2 is a graph 200 of three representative possibilities for the opening time distribution of individual switches of the switch array. Along an ordinate 202 of graph 200 is shown a fraction of switches that are closed as a function of time (shown along the abscissa 204). For instance, a value of unity along ordinate 202 indicates that all switches of the switch array are closed, while a value of zero along the ordinate 202 indicates that all switches of the switch array are open. Evidently, a time dependence of a resistance of the switch array will correspond to the fraction of switches that are closed.

A first possibility 206 for the opening time distribution of individual switches of the switch array represents a typical situation as is encountered in switch arrays. It will be evident that all switches are opened substantially simultaneously, i.e., a first time duration 208 over which the switches are opened is very small. Quite generally, in the discussions herein, opening time distributions of type 206 will be referred to as "fast" opening time distributions. FIG. 2 also shows two other possibilities 210 and 214 for opening time distributions. A second possibility 210 for the distribution of opening times of individual switches of the switch array represents a situation wherein the switch array is in electromagnetic communication with a mechanism or a system to control the opening of the individual switches, so that the opening is spread substantially uniformly over a second time duration 212 that is substantially greater than the first time duration 208. Non-limiting examples of the system to control the opening of the individual switches are discussed in relation to FIGS. 8 and 9. Quite generally, in the discussions herein, opening time distributions of type 210 will be referred to as "slow" opening time distributions. A third possibility 214 for the distribution of opening times of individual switches of the switch array represents a situation wherein the switch array includes a mechanism to control the opening of the individual switches, such that the opening is achieved substantially step-wise in time, so that, a third opening time duration 216 includes, for instance, two regimes 218 and 220 of time duration 222 and 224 respectively as depicted in FIG. 2. As may be evident from FIG. 2, the opening of the switches in each the two regimes 218 and 220 independently is spread substantially uniformly, with the rate of opening in the regime 218 being substantially higher than the rate of opening in regime 220. Quite generally, in the discussions herein, opening time distributions of type 216 will be referred to as "shaped" opening time distributions.

Figure 5:
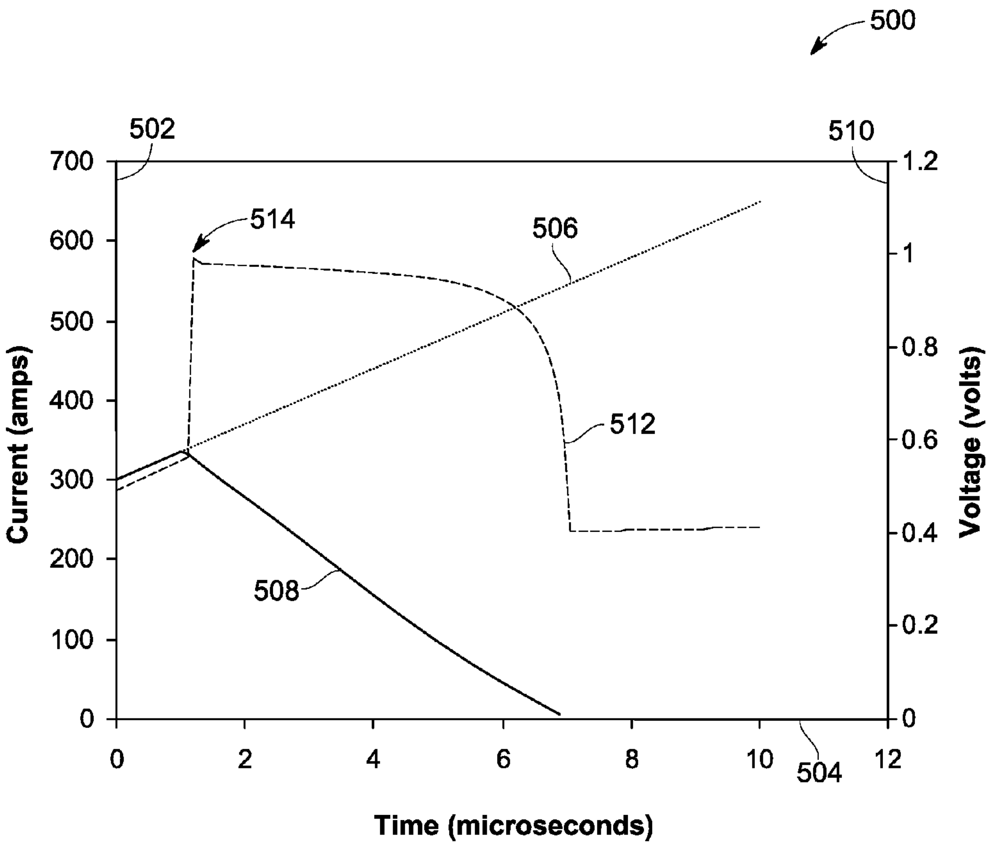
FIG. 5 is a graph that represents a time variation of load current, a time variation of HALT circuit current, and a time variation of the corresponding inductive voltage surge for a "shaped" opening time distribution, in accordance with one embodiment of the invention.

Simulations were performed in order to ascertain the time dependence of the inductive voltage surge for different opening time distributions of the electric device "switch array" 126 shown in FIG. 1. Typical conditions were used during the simulations, with a value of R D of about 0.0001 Ohm, a value of L D of about 10 nanoHenry, and a switch array resistance of about 0.00167 Ohm. The results of the simulations, provided in FIGS. 3-5, are now discussed.

FIG. 3 is a graph 300 that represents, along the left ordinate 302, a time variation (along the abscissa 304) of load current 306 and a time variation of HALT circuit current 308, for a "fast" opening time distribution of type 206. Along the right ordinate 310 is plotted a time variation of the corresponding inductive voltage surge 312. For the purposes of the simulation, a typical value of about 1 microsecond was used for the first opening time duration 208. It may be evident that, while a "fast" opening time distribution of type 206 results in a substantially rapid transfer of current out of the switches, it also generates a substantially high maximum in the inductive voltage surge "Vs" 314, which in the presently depicted embodiment, is about 8 Volt. To compare, a typical MEMS switch typically has a melt voltage "Vm" value of about 1 Volt. Since, the value of Vs substantially exceeds the value of Vm, during most of the first time period 208, therefore it is likely that a substantial number of switches would be destroyed if a "fast" opening timing distribution is used.

It seems therefore, that if individual switches in the switch array 126 are opened as quickly as possible (for example, as per the first opening time distribution 206), the resulting high rate of change of electric current flowing through the stray inductance of the HALT circuit 106 may generate enough voltage to cause arcing and destruction of an unacceptable number of individual switches of the switch array 126.

FIG. 4 is a graph 400 that represents, along the left ordinate 402, a time variation (along the abscissa 404) of load current 406 and a time variation of HALT circuit current 408, for a "slow" opening time distribution of type 210, according to one embodiment of the invention. Along the right ordinate 410 is plotted a time variation of the corresponding inductive voltage surge 412. For the purposes of the simulation, a typical value of about 7 microseconds was used for the second opening time duration 210. It may be evident that, a "slow" opening time distribution of type 210 results in a substantially slower transfer of electric current out of the switches when compared to the results shown in FIG. 3. It may further be evident that a maximum in the inductive voltage surge "Vs" 414 which is generated is substantially lower than the maximum 314 shown in FIG. 3. In the embodiment for which the results are depicted in FIG. 3, the maximum value of the inductive voltage surge 314 is about 8 Volt. To compare, a typical MEMS switch typically has a melt voltage " " value of about 1 Volt. As was the case for the data shown in FIG. 3, the value of Vs exceeds the value of Vm, during a part of the second time period 212, and therefore it is likely that some switches may still be damaged if a "slow" opening time distribution is employed.

A comparison of FIGS. 3 and 4 provides insight as to a possible reason for the high maximum value, of about 8 Volts, of the inductive voltage surge 314. It is likely that the first opening time distribution 206 is not matched to the transfer of electric current out of the HALT circuit 106. In other words, the resistance of the switch array, that is, the electric device 126, is rising faster than the current is being transferred out of the electric device 126. Therefore, a modification of the opening time distribution of the individual switches of the switch array (or more generally, of the electric device 126) may be a possible way to make more efficient use of the voltage that the individual switches can withstand without getting damaged. In other words, it may be possible to mitigate the maximum value of the inductive voltage surge by "shaping" the distribution of opening times of the switch array 126 to more closely match the transfer of electric current out of the switch array 126.

In order to explore the consequences of the above insight, a "shaped" third opening time distribution 214 was used. FIG. 5 is a graph 500 that represents, along the left ordinate 502, a time variation (along the abscissa 504) of load current 506 and a time variation of HALT circuit current 508, for a "shaped" opening time distribution of type 214. Along the right ordinate 510 is plotted a time variation of the corresponding inductive voltage surge 512. For the purposes of the simulation, a fraction of the switches (for example ½ the switches) are opened within the time duration 222 of about 0.2 microsecond, while the remaining fraction of switches (for example ½ the switches) are opened within the time duration 224 of about 6.8 microsecond. It may be evident that, a "shaped" opening time distribution of type 214 results in a substantially slower (as compared to the case of the "fast" first opening time distribution 206) transfer of electric current out of the switches, whereby the maximum in the inductive voltage surge "Vm" 514, which in the presently depicted embodiment, is substantially less than about 1 Volt. To compare, a typical MEMS switch typically has a melt voltage "Vm" value of about 1 Volt. Since, the value of Vs is less than the value of Vm, during the entire time period 212, the individual switches of the switch array 126 are likely to survive if a "shaped" opening timing distribution 214 is used. Evidently, as per the earlier insight, one is indeed able to minimize the inductive voltage surge by shaping the distribution of the opening of the switches in the array.

Non-limiting embodiments of this invention manage the inductive voltage surge that would otherwise occur, during a typical prior art distribution of opening times (for instance, of type 206) by causing the opening of individual switches in the array to be spread over a suitable time interval. Those skilled in the art will recognize that the present invention includes any scheme used to shape the opening time distribution of the individual switches of a switch array in a manner so as to mitigate the inductive voltage surge within the HALT circuit, during the duration over which the individual switches are opening, to a value that is below the value of melt voltage of any individual switch. The openings time distributions 206 and 214 constitute two non-limiting examples of such a scheme.

Figure 6:
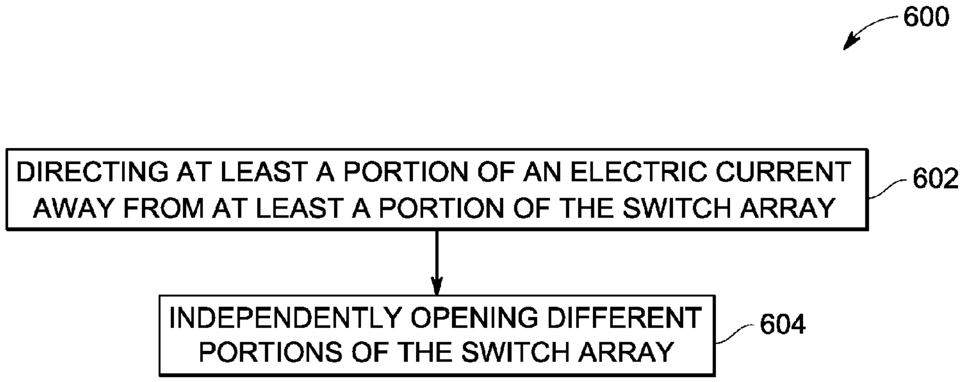
FIG. 6 is a flow chart depicting a method to reduce an inductive voltage surge across an electrical device, in accordance with one embodiment of the invention.

In accordance with one embodiment of the invention therefore, depicted via a flow chart in FIG. 6, a method 600 to reduce an inductive voltage surge across a switch array, or, more generally, across an electrical device (for instance, of type 126) is provided. Typically, for the case when the electrical device 126 is a switch array, employment of a prior art opening time distribution (for instance, of type 206) as discussed previously, results in an inductive voltage surge that can achieve values greater than the melt voltage "Vm" of any individual switch comprising the switch array. For instance, the maximum value 314 of the inductive voltage surge depicted in FIG. 3 is about 8 Volts.

At step 602, the method 600 includes the step of directing at least a portion of an electric current away from at least a portion of the switch array. In one embodiment of the invention, said portion of electrical current flows through a HALT circuit (for instance, of type 106). In one embodiment of the invention, the HALT circuit includes a diode bridge (for instance, of type 110). The inductive voltage surge occurs, for instance, across the diode bridge within the HALT circuit. In one embodiment, the method 600 is capable at least of mitigating, during said opening, development of the inductive voltage surge across the HALT circuit. At step 604, the method includes independently opening different portions of the switch array. In one embodiment of the invention, any one or more individual switches of the switch array can be toggled between an open state and a closed state in response to independent gating voltages. In one embodiment of the method 600, the opening of different portions of the switch array is performed substantially continuously in time. A non-limiting example of such a continuous time distribution is the second possibility of opening time distribution 210. In one embodiment of the method 600, the opening of different portions of the switch array is performed substantially step-wise in time. A non-limiting example of such a continuous time distribution is the third possibility of opening time distribution 214. In one embodiment, the method 600 is capable of mitigating the inductive voltage surge across a switch array, during said opening, to a value that is substantially less than the melt voltage "Vm".

Figure 7:
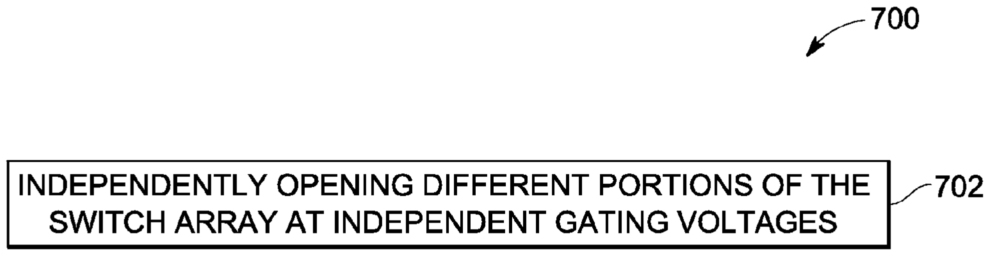
FIG. 7 is a flow chart depicting a method of varying electrical resistance of an electrical device, in accordance with one embodiment of the invention.

In accordance with another embodiment of the invention, depicted via flow chart 700 in FIG. 7, a method of varying electrical resistance of a switch array, or more generally, across an electrical device (for instance, of type 126) is provided. At step 702, the method 700 includes independently opening different portions of the switch array at independent gating voltages.

Figure 8:
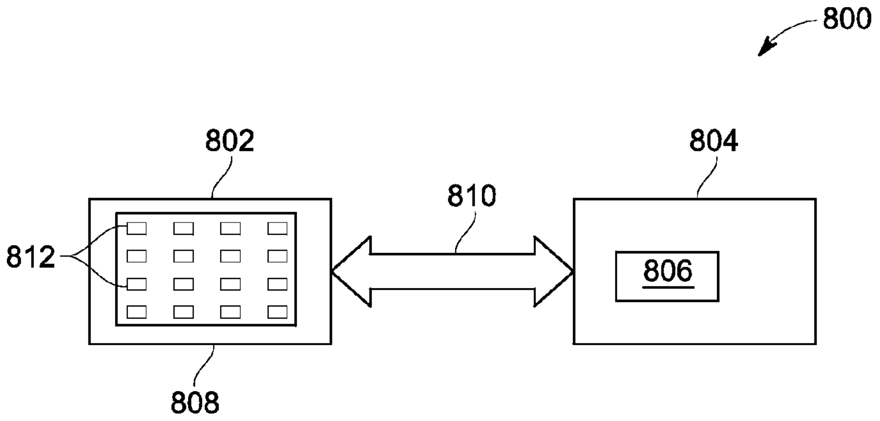
FIG. 8 is a schematic view of an electric system to reduce an inductive voltage surge across an electrical device including a current bypass circuit, in accordance with one embodiment of the invention.

In accordance with one embodiment of the invention, shown via schematic diagram 800 in FIG. 8, a system 802 to reduce an inductive voltage surge across an electric device 804 including a current bypass circuit 806 is disclosed. In one embodiment of the invention, the system 802 and the electrical device 804 are capable of electromagnetic communication 810. In one embodiment of the invention, the current bypass circuit 806 includes a HALT circuit (for instance, of type 106). In one embodiment of the invention, the system 802 includes a subsystem 808 capable of independently opening different portions of the electric device 804 according to shaped distribution of opening times (for instance, of type 216). The electrical device 804, quite generally, represents an electromagnetic load, and those skilled in the art would recognize that the system 802, more generally, could be employed to reduce an inductive voltage surge across any suitable electromagnetic load. A non-limiting example of a shaped distribution of opening times is the third possibility of opening time distribution 214 depicted in FIG. 2. The inductive voltage surge may occur during said opening of the switch array. In one embodiment, the subsystem 808 may include a plurality of gate drivers 812. In one embodiment of the invention, any individual gate driver of the plurality of gate drivers 812 is independently controllable to toggle the corresponding switch between an open position and a closed position.

Figure 9:
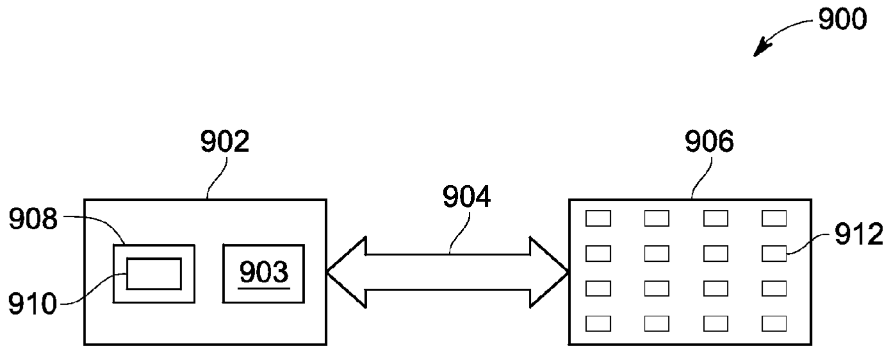
FIG. 9 is a schematic view of a system to reduce an inductive voltage surge across a switch array, in accordance with one embodiment of the invention.

In accordance with an embodiment of the invention, shown via schematic diagram 900 in FIG. 9, a system 902 to reduce an inductive voltage surge across a switch array 906 is disclosed. The system 902 and the switch array 906 are capable of electromagnetic communication 904. The switch array, quite generally, represents an electromagnetic load, and those skilled in the art would recognize that the system 902, more generally, could be employed to reduce an inductive voltage surge across any suitable electromagnetic load. The system 902 includes, a current bypass circuit 903.

In one embodiment of the invention, the current bypass circuit 903 includes a HALT circuit (for instance, of type 106). In one embodiment of the invention, the system 902 includes a control system 908 including a signal generator 910. In one embodiment of the invention, the control system 908 is capable of independently toggling any portion 912 of the switch array 906 between an open state and a closed state in response to a control signal generated by the signal generator 910.

In one embodiment of the invention, the switch array is disposed within a hermetically sealed chamber. In one embodiment of the invention, an environment within the hermetically sealed chamber includes an inert gas. In one embodiment of the invention, an environment within the hermetically sealed chamber includes a vacuum. In one embodiment of the invention, the switch array services an electrical power device. In one embodiment of the invention the electrical power device is a motor starter.

Aspects of the present invention propose another technique to adjust the actuation timing of the MEMS switching array to reduce the voltage surge (e.g., inductive voltage surge) that can develop in at least some of the MEMS switches during the switching of current, (e.g., load current switching). In this context, the timing adjustment refers to adjusting a temporal distribution of the gating signal applied to the plurality of MEMS switches, which make up the MEMS switching array. This temporal distribution may be advantageously shaped to reduce the magnitude of the voltage surge.

It has been observed that when the gate line of the switching array is connected in series-circuit, there is certain time constant intrinsically formed along the gating line of the array due to the aggregation of the individual RC time constants of the individual switches. For example, each gate of the switch may have its own intrinsic capacitance and resistance values relative to the beam of the switch. For a given array, this time constant is generally fixed and may be based on various physical characteristics of the array, e.g., die materials, array topology, etc. It will be appreciated that, by itself, the intrinsic time constant formed along the gating line of the array may not be sufficient to meet a desired temporal distribution to the gating signal applied for actuating the plurality of MEMS switches.

It will be appreciated, however, that the recognition of the foregoing basic concept (e.g., recognizing an intrinsic temporal response of the array to a time-varying gating signal) has led to a relatively straightforward and elegant technique for adjusting the gating voltage timing of the array. Namely, uncomplicated circuitry may be electrically coupled to the gate line to appropriately adjust the temporal distribution of the gating signal applied to the plurality of MEMS switches. This approach may be attractive to a designer since it does not involve multiple gating lines and concomitant layout complexity. Moreover, this approach does not involve the challenges likely to arise if one were to individually tailor structural features of each switch in an attempt to tailor the individual gating voltage response of the switches that make up the switching array.

Figure 10:
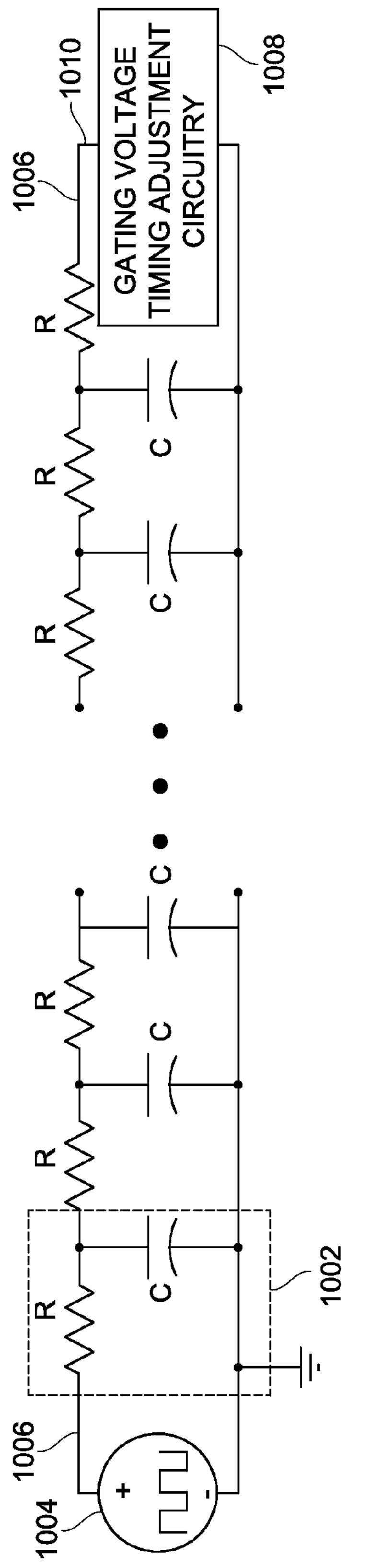
FIG. 10 is a schematic of an example network model representation of a plurality of gating circuits, as may be electrically connected in series-circuit in a MEMS switching array and coupled to a gating voltage timing-adjustment circuitry embodying aspects of the present invention.

FIG. 10 is a schematic of an example network model representation of a MEMS switching array 1000 comprising a plurality of gating circuits, (such as gating circuit 1002) as may be electrically connected in series-circuit. Each gating circuit including a respective time constant based on the intrinsic RC (resistor, capacitor) values of the gating circuit. Voltage source 1004 represents a gate driver configured to apply a gating signal through a gating line 1006 to MEMS switching array 1000. In accordance with aspects of the present invention, gating voltage timing-adjustment circuitry 1008 is coupled to the gate line to adjust the temporal distribution of the voltage of the gating signal applied to the plurality of MEMS switches.

Figure 14:
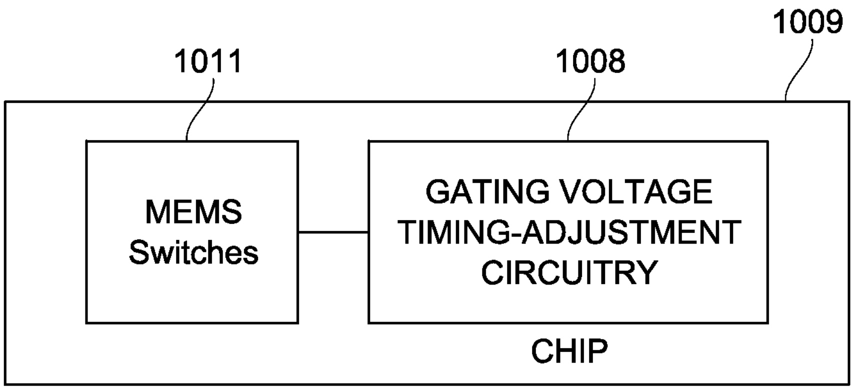
FIG. 14 is a block diagram representation of one example embodiment of MEMS switching array as may be coupled to gating circuitry constructed on-chip.
Figure 15:
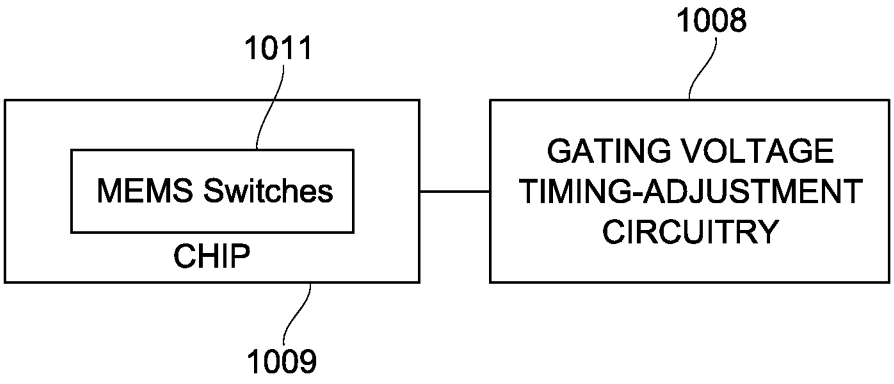
FIG. 15 is a block diagram representation of another example embodiment of a MEMS switching array as may be coupled to circuitry constructed off-chip.

In one example embodiment, gating voltage timing adjustment circuitry 1008 may comprise at least one passive component selected to affect a temporal response of the MEMS switching array to the gating signal. One example of circuitry 1008 may be at least a capacitor. Another example of circuitry 1008 may be at least a resistor coupled to at least a capacitor (e.g., RC circuit). It will be appreciated that circuitry 1008 may be constructed on-chip, e.g., constructed on a semiconductor chip 1009 with MEMS switches 1011, as conceptually illustrated in FIG. 14, or may be off-chip circuitry, as conceptually illustrated in FIG. 15.

Although FIG. 10, illustrates a terminal 1010 of circuitry 1008 connected at one end of gate line 1006, it will be appreciated that terminal 1010 of circuitry 1008 may be connected anywhere between the two ends of the gate line, or may be connected at either of the two ends of the gate line. Accordingly, the location of circuitry 1008 shown in FIG. 10 should be construed in an example sense and not in a limiting sense.

Figure 11:
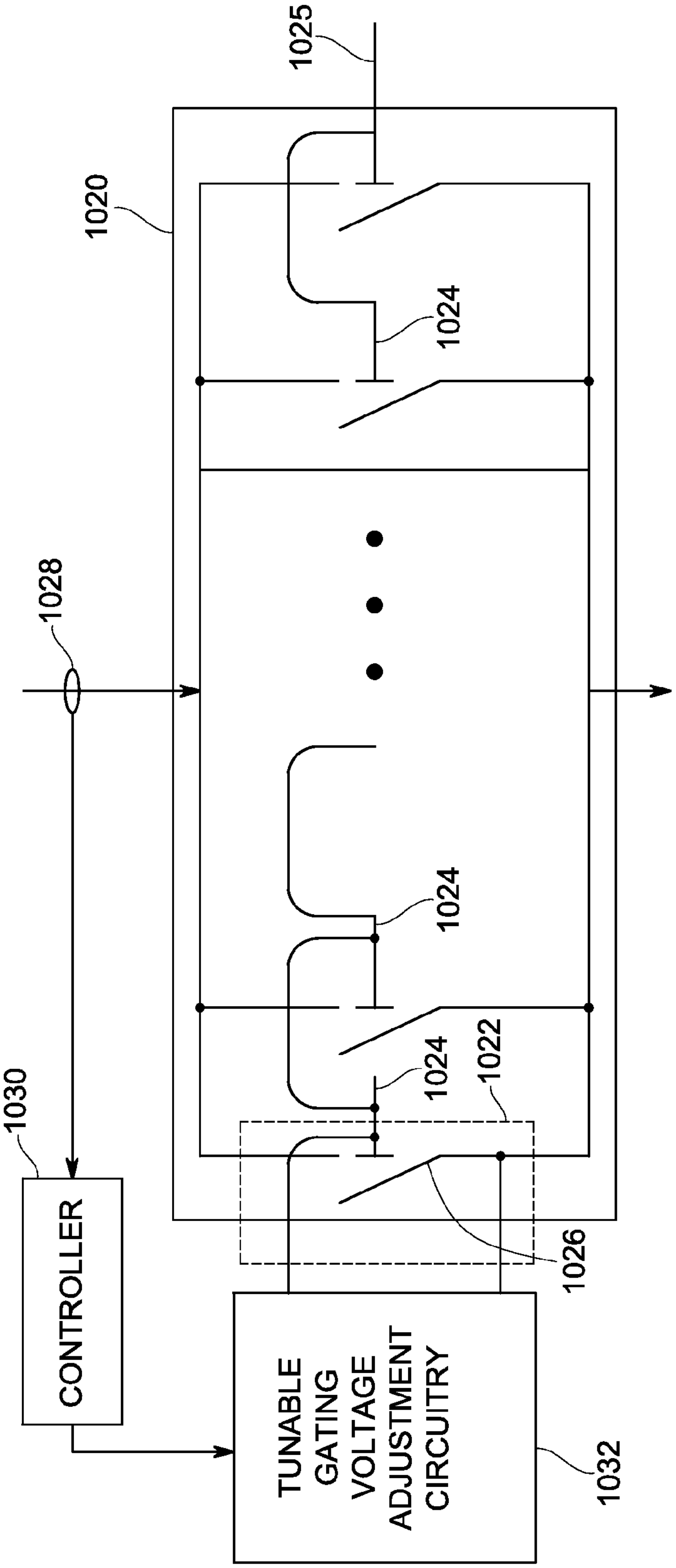
FIG. 11 is a schematic of an example MEMS switching array as may be coupled to a dynamically tunable gating voltage timing-adjustment circuitry embodying aspects of the present invention.

FIG. 11 is a schematic of an example MEMS switching array 1020 made up of a plurality of MEMS switches (e.g., MEMS switch 1022) coupled in parallel-circuit to one another. Each switch includes a respective gate 1024 coupled to a common gating line 1025, and a beam 1026 (e.g., cantilever beam) as may be actuated (in response to the voltage level of the gating signal) from an electrically-open condition (as shown in FIG. 11) to an electrically-closed switching condition.

Figure 12:
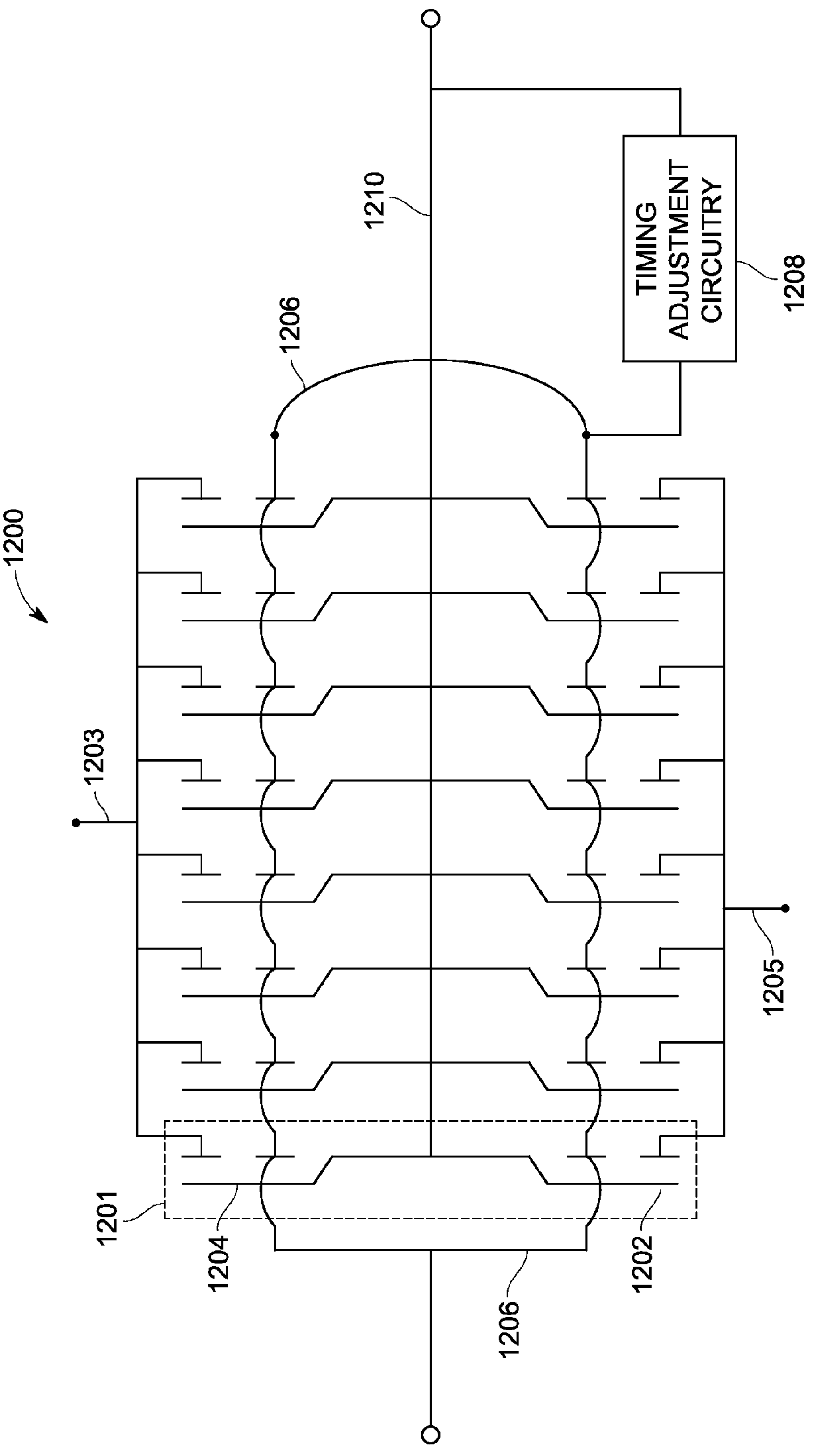
FIG. 12 is an example embodiment of an alternative MEMS switching array architecture that can benefit from aspects of the present invention.

In one example embodiment, a sensor 1028 may be coupled to sense a level of current to be switched by the MEMS switching array. A controller 1030 may be coupled to a tunable circuitry 1032 configured to dynamically adjust the temporal distribution of the gating signal applied to the array based on the sensed level of current to be switched by the MEMS switching array. For example, if the level of current to be switched by the switching array is relatively large, then tunable circuitry 1032 may be dynamically configured to provide a relatively wider spread to the temporal distribution of the gating signal, as may be accomplished with a relatively larger capacitance value. Conversely, if the level of current to be switched by the switching array is relatively small, then tunable circuitry 1032 may be dynamically configured to provide a relatively narrower spread to the temporal distribution of the gating signal, as may be accomplished with a relatively smaller capacitance value. It will be appreciated that tunable circuitry 1032 need not be limited to a two-state configuration (e.g., wider spread or narrower spread) for the temporal distribution of the gating signal being that additional states (e.g., intermediate states) may be provided in tunable circuitry 1032 for the temporal distribution of the gating signal. FIG. 12 is an example embodiment of an alternative MEMS switching array architecture that can equally benefit from aspects of the present invention. In this example embodiment, a MEMS switching array 1200 comprises a plurality of switching elements 1201 made up of back-to-back (series-circuit) beams (e.g., cantilever beams 1202 and 1204) arranged in parallel-circuit between first and second contacts 1203 and 1205 and driven by a gating signal (e.g., potential difference) between a common gating line 1206 and a common beam line 1210. In this example switching array architecture, the gating voltage timing adjustment may also be readily imparted by coupling a gating voltage timing adjustment circuitry 1208, as described above. Circuitry 2008 may be coupled between beam line 1210 and gating line 1206, as would be appreciated by one skilled in the art. It is noted that the location of timing adjustment circuitry 1208, as shown in FIG. 12, should not be construed in a limiting sense since the voltage-surge reduction benefits provided by such a circuitry are not contingent on the specific coupling location of voltage timing adjustment circuitry 1208 along lines 1210 and 1206.

Figure 13:
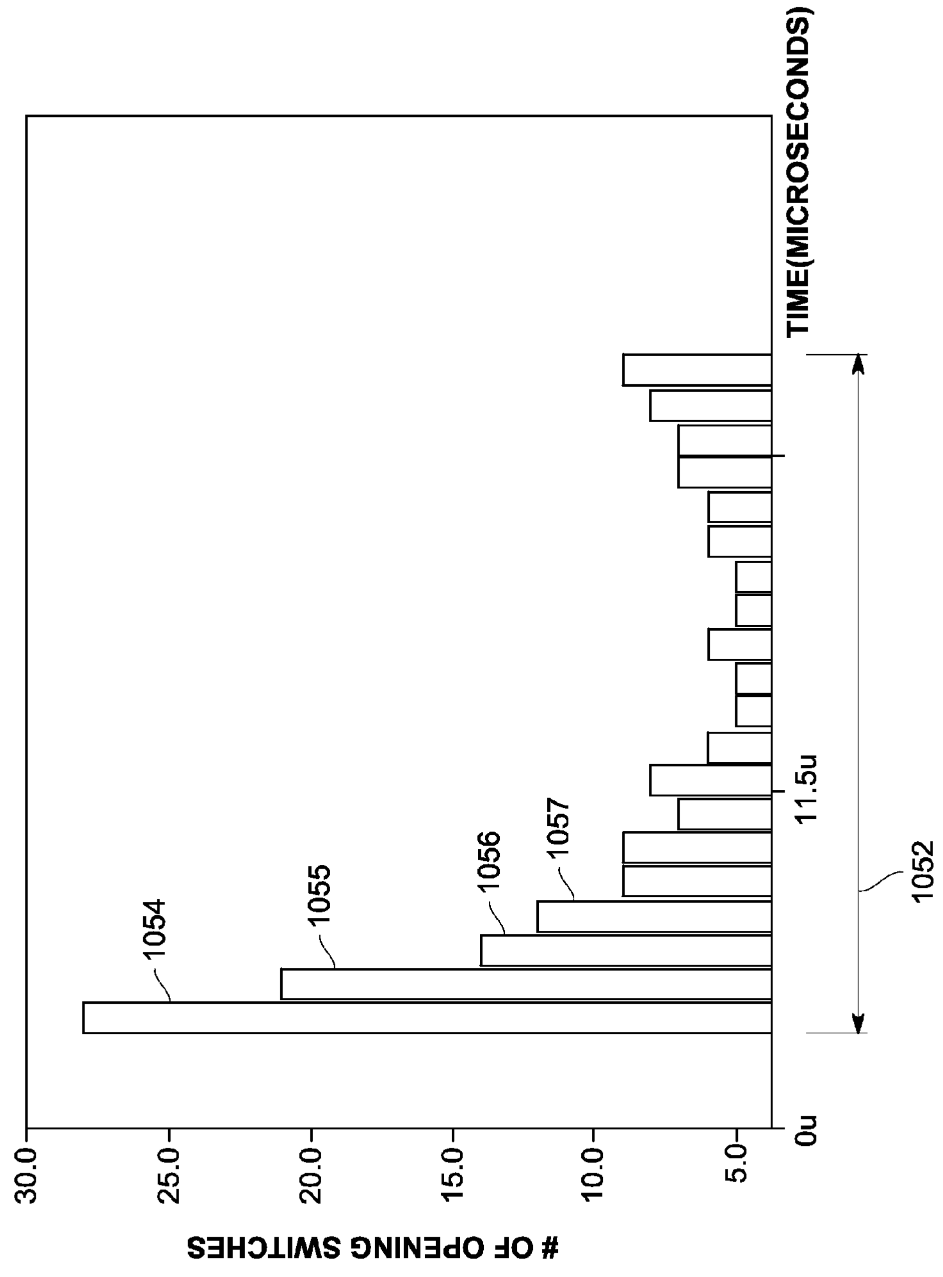
FIG. 13 is a histogram plot for illustrating example operational aspects of an example temporal distribution of a gating signal applied to a MEMS switching array embodying aspects of the present invention.

FIG. 13 is a histogram plot for illustrating example operational effects of one example temporal distribution of a gating signal applied in accordance with aspects of the present invention to a MEMS switching array (e.g., made up of 160 switches) coupled to an example gating voltage timing adjustment circuitry (e.g., a 200 pF capacitor). The temporal distribution may be configured to appropriately distribute the actuation (e.g., opening or closing) of the individual switches of the MEMS switch array. Each of the bars in FIG. 13 illustrates a respective distribution of the number of switches, which may be sequentially actuated over a time interval. In this example, the actuation of the total number of switches of the MEMS switch array of switches may be distributed over a time interval 1052 of approximately a few microseconds. It will be further appreciated that the temporal distribution shown in FIG. 13 is shaped so that a relatively larger fraction of the total number is switches (as may be appreciated from the number of switches indicated by the first four bars 1054-1057 of the histogram) is actuated during an early portion of time interval 1052. This example temporal distribution shape is believed to be conducive to effectively reduce the magnitude of the voltage surge by "shaping" the distribution of the actuation times of the switch array to substantially track the transfer of electric current through the switch array.

While aspects of the invention have been described in detail in connection with just a certain number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A Micro-electro-mechanical systems (MEMS) switching array comprising:

a plurality of MEMS switches comprising a plurality of gating circuits electrically-connected to one another in series-circuit through a common gate line, a time constant intrinsically formed along the gating line due to aggregation of individual time constants of the gating circuits, the plurality of switches coupled to switch a current in response to a gating signal applied through the common gate line; and circuitry coupled to the common gate line to adjust in view of the time constant intrinsically formed along the gating line a temporal distribution of the gating signal applied to the gating circuits of the plurality of MEMS switches to distribute over time individualized opening times of the plurality of MEMS switches, wherein the temporal distribution is shaped to reduce a voltage surge that can develop in at least some of the plurality of MEMS switches during the switch of current.

2. The MEMS switching array of claim 1, wherein the circuitry comprises a sensor for sensing a level of the current to be switched by the MEMS switching array.

3. The MEMS switching array of claim 2, wherein the circuitry comprises control circuitry configured to dynamically adjust the temporal distribution of the gating signal based on the sensed level of current to be switched by the MEMS switching array.

4. The MEMS switching array of claim 1, wherein the circuitry comprises at least one passive component selected to affect a temporal response of the MEMS switching array to the gating signal.

5. The MEMS switching array of claim 4, wherein said at east one passive component comprises a capacitor.

6. The MEMS switching array of claim 5, wherein said at least one passive component further comprises a resistor coupled to the capacitor.

7. The MEMS switching array 1, wherein the circuitry comprises an on-chip circuitry.

8. The MEMS switching array of claim 1, wherein the circuitry comprises an off-chip circuitry.

9. The MEMS switching array of claim 1, wherein the circuitry is coupled across the gate line and a beam line of the switching array.

10. The MEMS switching array of claim 1, wherein the gate line extends from a first end to a second end, and further wherein the circuitry is coupled between the ends of the gate line.

11. A system comprising:

an array of MEMS switches comprising a plurality of gating circuits electrically-connected to one another in series-circuit through a common gate line, a time constant intrinsically formed along the gating line due to an aggregation of individual time constants of individual gating, circuits, the plurality of switches coupled to switch a current in response to a gating signal applied through a common gate line;

a gate driver coupled to the common gate line to supply the gate signal; and circuitry coupled to the common gate line to adjust in view of the time constant intrinsically formed along the gating line a temporal distribution of the gating signal applied to the gating circuits of the plurality of MEMS switches to distribute over time individualized opening times of the plurality of MEMS switches, wherein the temporal distribution is shaped to reduce a voltage surge that can develop in at least some of the MEMS switches.

12. The system of claim 11, wherein the circuitry comprises a sensor for sensing a level of the current to be switched by the MEMS system.

13. The system of claim 12, wherein the circuitry comprises control circuitry configured to dynamically adjust the temporal distribution of the gating signal based on the sensed level of current to be switched by the MEMS switching array.

14. The system of claim 11, wherein the circuitry comprises at least one passive component selected to affect a temporal response of the MEMS switching array to the gating signal.

15. The system of claim 14, wherein said at least one passive component comprises a capacitor.

16. The system of claim 14, wherein said at least one passive component comprises a resistor coupled to a capacitor.

17. The system of claim 11, wherein the circuitry comprises an on-chip circuitry.

18. The system of claim 11, wherein the circuitry comprises an off-chip circuitry.

19. The system of claim 11, wherein the gate line extends from a first end coupled to the gate driver to a second end, and further wherein the circuitry is coupled between the gate driver and the second end of the gate line.

20. The system of claim 11, wherein the gate line extends from a first end coupled to the gate driver to a second end, and further wherein the circuitry is coupled to the second end of the gate line.

21. The system of claim 11, wherein the gate line extends from a first end to a second end and the circuitry is located between the two ends.

* * * * *